(No Model.)
J. KNIBBS.
AUTOMATIC HARNESS SUSPENDER.
No. 274,501. Patented Mar. 27, 1883.
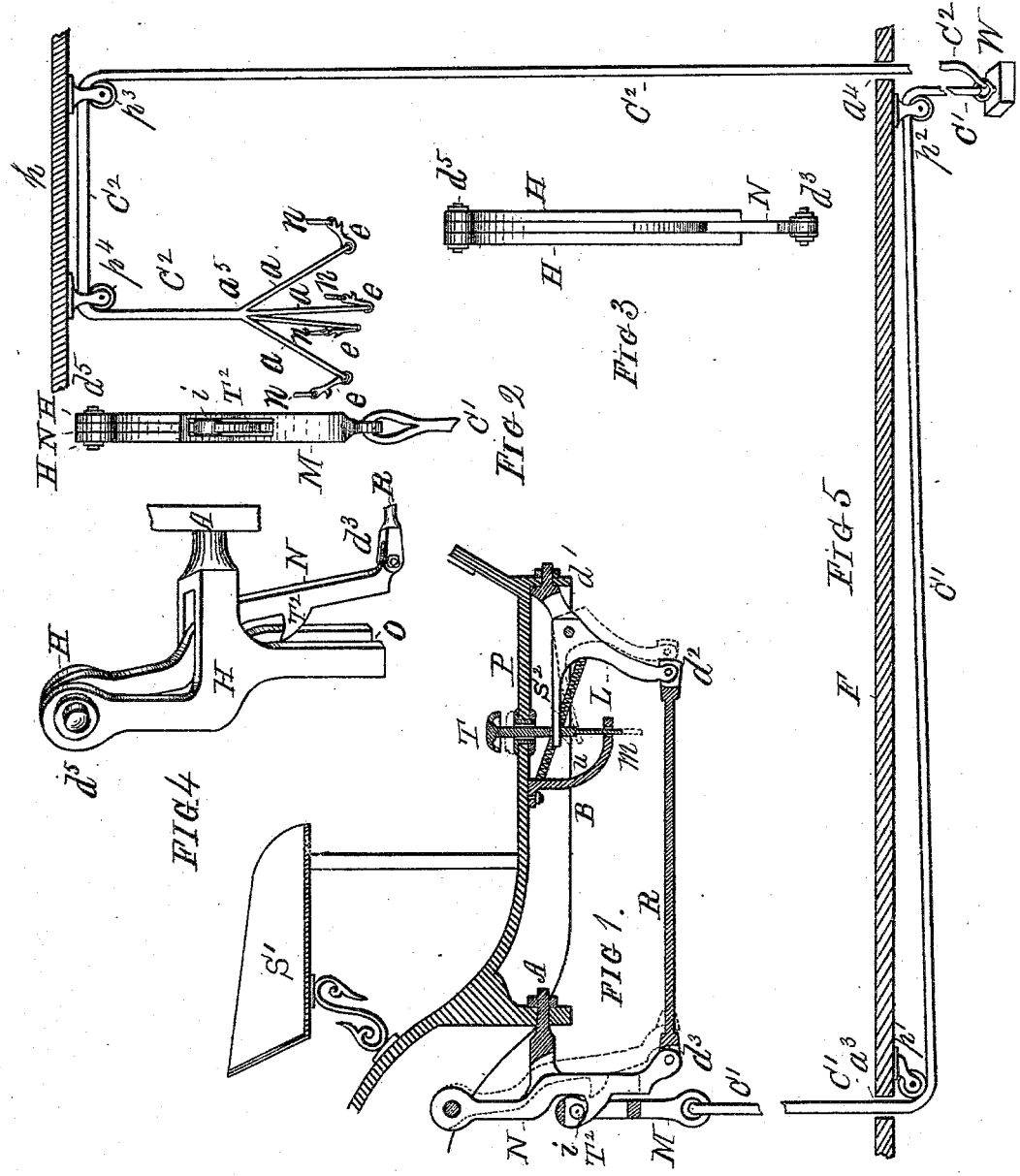
Witnesses
Charles S. Brintnall
Wm. A. Saxe
Inventor
James Knibbs
by William E. Hagan
his ATTORNEY

UNITED STATES PATENT OFFICE.

JAMES KNIBBS, OF TROY, NEW YORK.

AUTOMATIC HARNESS-SUSPENDER.

SPECIFICATION forming part of Letters Patent No. 274,501, dated March 27, 1883.

Application filed September 13, 1882. (No model.)

*To all whom it may concern:*

Be it known that I, JAMES KNIBBS, of the city of Troy, county of Rensselaer, and State of New York, have invented a new and useful improvement in apparatus for operating the suspended weights which cause the descent of hanging harness, and also open the doors of steam fire-engine and hook-and-ladder-truck houses, of which the following is a specification.

My invention relates to means for tripping or releasing so as to make operative the weights whose attached cords upset or invert the hooks by which the harness of the animals that draw fire-extinguishing apparatus is suspended, and so that the harness shall fall into place on the backs of the animals when the latter are in position beneath it. This kind of harness, as is well known, is suspended by means of link-hooks, with the upper end of each of the links attached by a cord to the ceiling, and the lower end of each of the links connected by a cord with another cord which passes upwardly over pulleys and is weighted. The hooks being formed on the sides of the links, when the weight is tripped so as to fall the attached cords invert the links, by which the harness is released from the upturned hooks, so as to fall into place over and on the backs of the animals in position beneath the harness.

Heretofore the release of the suspended harness has been accomplished by means of a cord which passed downwardly from the ceiling of the room so as to hang over the driver's seat. This method for operating the descent of the weight and harness was found to be objectionable, in the fact that the cord thus located swings to and fro, and is difficult to grasp, and in the further fact that the driver needs the use of his hands for other purposes as soon as he mounts the platform. In addition to these difficulties, the hanging cord at times will whip around the signal and other projecting parts of the moving apparatus, so as to attach thereto and be broken. To avoid these contingencies I dispense with the pendent cord thus used to trip the weight, and substitute therefor one which is attached to the weight, passes up through the floor, and hooks onto the engine or vehicle, to trip which so as to cause the release of the harness. I construct and attach to the engine or vehicle an angular turn-lever, a rod which connects the lever with the hook, and operate the angular lever by means of a treadle-rod from the driver's platform or seat, as will hereinafter be more fully described.

In the accompanying drawings, forming a part of this specification, there are five figures, illustrating my invention and the mechanism with which it connects, and in all of which the same designation of parts by letter-reference is used.

Figure 1 is a vertical section taken through the driver's seat and platform, the treadle, treadle-trace, and connecting-rod, with what will hereinafter be designated and described as the swinging bar and hook, and the angular lever, shown in side elevation, as well as the link in the end of the tripping-cord. Fig. 2 shows an end elevation, taken from the rear, of that part of the mechanism where the tripping-cord attaches to the other parts. Fig. 3 shows also a rear end elevation of the parts with the attaching-link and tripping-cord omitted. Fig. 4 illustrates in perspective the same parts of the mechanism as are shown at Fig. 3, and in connection therewith an actuating-rod and the hanging-hook, to which the tripping-cord, by means of a link, attaches, the hook being shown as swung out to indicate its position when the cord has been tripped. Fig. 5 shows the relative position of the cords, pulleys, weight, and the harness-connections.

The co-operating parts of the mechanism and those with which they connect, as thus illustrated, are designated by letter-reference, and their operation described as follows:

The letter W indicates a pendent weight, connected by means of the cords $C^2$ and the pulleys $p^3$ and $p^4$ at $a^5$ with the branching cords $a\ a\ a\ a$, the pendent ends of the latter being secured to the eyes in the lower ends of the harness-hooks $e\ e\ e\ e$, with the upper ends of the latter being attached to the cords $n\ n\ n\ n$, and the latter continued upwardly and attached to the ceiling. When thus arranged and the weight W is released so as to descend and pull upon the cord $C^2$ and its branch ends $a\ a\ a\ a$ at $a^5$, the position of the hooks is reversed and they are upset, so as to release the harness, which falls by gravity. So far as the hooks and their connection with the ceiling and the weight are concerned, they are not my invention, and they are merely illustrated to show the operation of my connected improvement.

The letter S indicates the driver's seat; P, the platform, and T a treadle working through the platform and a guide-bar, B, by means of the rod M.

The letter L designates an angular turn-lever, which is pivoted at $d'$, and through the horizontal arm of which lever the treadle-rod passes, with a stop upon the rod above the lever-arm.

$S^2$ indicates a spiral spring, connecting the angular lever L with the brace B.

As the parts are thus constructed and connected, when the treadle is pressed down it actuates the turn-lever L on its pivoted connection at $d'$, and also a connecting-rod, R, which is pivoted to the lower arm of the turn-lever at $d^2$, and thus converts the initial vertical motion of the treadle into horizontal motion, which is exerted against the force of the spring $S^2$. The connecting-rod R at $d^3$ is pivoted to the lower end of the swinging bar N, the latter being constructed with the projecting hook $T^2$ upon its rear face, and at its top, at $d^5$, pivoted so as to tongue into the slot O, formed in the bracket H, the latter being attached to the engine at A. When the bar N is within the slot O and its rear face coincident with the rear face of the bracket the hook $T^2$ upon this swinging bar N projects beyond the rear face of the bracket, in which position it is adapted to connect with a link or eye attached to the tripping-cord C', and thus sustain the weight W. When by any means this swinging bar N is drawn out frontward at the bottom and into the position shown at Fig. 4 the eye or link connecting with the tripping-cord is forced from off the hook $T^2$ by the stationary bracket, the weight falls, and the harness is released to fall upon the horses' backs.

With the parts thus constructed it is evident that the tripping-cord would automatically unhook from the passing out of the engine without the use of the treadle or lever, should the mechanism from any cause, consequent upon the hurry and excitement attending its use, become inoperative, and thus the hook and its connection to receive the tripping-cord are constructed so as to perform a specific function independently of the treadle, angular lever, and connecting-rod.

Although any form of link or eye that will pass over and hang onto the hook $T^2$ may be used thereon to suspend the weight by means of the tripping-cord, I prefer to use one constructed as indicated at M, which is slotted longitudinally for the entrance of the hook, and has within the slot at its top the roller $i$.

Mechanically the tripping-cord attachment is forced from off the hook (as the latter and connected bar N are swung out frontward) by the rear face of the stationary bracket, and, as the same result would be produced in this respect were one side of the bracket used instead of both, hence I do not limit my invention to the use of a forked bracket.

The tripping-cord C' passes upwardly through the floor from beneath the standing place for the engine, as indicated at $a^3$, and by means of the pulleys $p'$ and $p^2$ on the under side of the floor connects with the weight W, so as to hold up the latter with the other cord, $C^2$, slack. When the tripping-cord is thus located for attachment to the engine, the cord, in combination with the link M, produces a new method of operating the weight.

Where a pendent weight is used to open the doors of engine-houses independently of operating the release of the harness, this mechanism may be employed to perform the same office of tripping the weight as where a weight is used to perform both offices simultaneously or either operation separately.

As the angular lever, the connecting-rod R, and the swinging hook-bar N would perform the same office and in the same manner, in combination with one or both arms of the stationary bracket, whether the angular lever was actuated by the rod M and treadle T or by a rod performing the same office operated from the driver's seat, or by the latter, or on the brake of the engine, I do not limit my invention to the combination of these factors with the treadle T.

Having thus described my invention, what I claim, and desire to secure by Letters Patent, is—

1. In a device for detaining or tripping the cord and weight which releases so as to fall the hanging harness used upon the animals which draw fire-extinguishing apparatus, the combination of the swinging bar N, the hook $T^2$, attached to the said bar, and the bracket H, attached to the under side of the engine or vehicle, arranged to operate as herein shown and described.

2. In a device for detaining or tripping the weight used to release the pendent harness used upon the animals which draw steam fire-engines or other fire-extinguishing apparatus, the combination of the hook $T^2$ upon the under side of the engine or apparatus, a link or eye adapted to take a vertical hold on said hook, and a tripping-cord connecting the link or eye with the tripping-weight through an opening in the floor beneath the engine or vehicle, as herein shown and described.

3. In an apparatus for detaining or tripping the pendent weight employed to release the hanging harness used upon the animals which draw steam fire-engines or other fire-extinguishing apparatus, the combination of the swinging bar N, the hook $T^2$, constructed on the latter, the bracket H, attached to the engine or vehicle, the pivoted angular turn-lever L, and an actuating-rod connected with the lever-arm and adapted to communicate motion to the said lever and the aforesaid connected parts, in the manner herein shown and described.

4. In an apparatus for detaining or tripping the weight employed to release the pendent harness used upon the animals which draw steam fire-engines and other fire-extinguishing appliances, the combination of a link or eye upon the end of a tripping-cord that connects with the tripping-weight from beneath the engine or vehicle, the swinging bar N and attached hook $T^2$, the bracket H, attached to the engine or vehicle, the rod R, angular lever L, treadle-rod M, and treadle T, constructed to operate substantially as herein shown and described.

Signed at Troy, N. Y., this 12th day of September, 1882, and in the presence of two witnesses.

JAMES KNIBBS.

Witnesses:
E. OGDEN ROSS,
CHARLES S. BRINTNALL.